UNITED STATES PATENT OFFICE.

GEORGE R. WILLIAMS, OF RIDGEWOOD, NEW YORK.

COMPOUND FOR ARTIFICIAL STONE.

SPECIFICATION forming part of Letters Patent No. 362,594, dated May 10, 1887.

Application filed December 10, 1886. Serial No. 221,221. (No specimens.)

*To all whom it may concern:*

Be it known that I, GEORGE R. WILLIAMS, a citizen of the United States, residing at Ridgewood, in the county of Queens and State of New York, have invented a new and useful Improvement in Compounds, of which the following is a specification.

My invention relates to a composition stone for use as foundation and piers of elevated railroads, bridges, &c.

My composition stone consists of the following ingredients, combined in the proportions stated, viz: shellac, two parts, by measure; alum, ten parts, by measure; rosin, twenty-five parts, by measure; sand, sixty-three parts, by measure.

To make the said stone, heat the rosin in a vessel until melted, then add the alum, and afterward the shellac. The sand is to be added last; and when all of the ingredients have become thoroughly mixed the mass, which is in a semi-fluid state, is placed in a mold of the shape desired. After placing in a mold, cold water is poured over the said mold until the composition has become hard, which it will do in a short time. When hard the stone has an appearance somewhat resembling sandstone, being of a grayish color and having a glittering appearance, showing the sand in its composition; but my composition stone is much more compact than the ordinary sandstone and capable of bearing very heavy weights. It is also lighter than the stone now in use for bridge and other foundations, and therefore more easily transported.

For the building of bridge or railroad foundations and piers the stone would be formed in large blocks, similar in size and shape to the blocks of stone usually employed in such constructions; but my stone can be used in a number of places and for a variety of purposes, and obviously it would be cast in a shape to accommodate the purpose for which it is to be used.

My composition stone can be advantageously used wherever strength and comparative lightness are desirable and exposure to the elements is unavoidable.

I am aware that composition stones have been made previous to this time; but the ingredients used in my composition stone are comparatively cheap, and the resulting stone is strong, light, and durable—the three desirable points of excellence in a stone for the purpose for which it is designed.

What I claim, and desire to secure by Letters Patent of the United States, is—

The herein-described composition of matter for use as foundation-stones, building-blocks, and the like, consisting of shellac, alum, rosin, and sand, in substantially the proportions specified.

In testimony that I claim the foregoing as my own I have hereto affixed my signature in presence of two witnesses.

GEORGE R. WILLIAMS.

Witnesses:
NICHOLAS VAN ANTWERP,
JOHN E. BELL.